United States Patent Office 3,052,728
Patented Sept. 4, 1962

3,052,728
DECOLORIZATION OF CRYPTOPHENOLS BY TREATMENT WITH CARBON DIOXIDE
Albert L. Rocklin, Walnut Creek, Calif., assignor to Shell Oil Company, a corporation of Delaware
No Drawing. Filed Nov. 30, 1959, Ser. No. 856,006
13 Claims. (Cl. 260—619)

This invention relates to a process for decolorizing phenolic compounds. More particularly, it relates to a process for substantially decolorizing colored phenolic compounds in basic liquid media.

In the preparation of many phenolic products, particularly those alkylated phenols employed as stabilizers and antioxidants, the product is obtained by reaction of a phenol with an aldehyde or ketone in basic media. Alternatively, certain, 2,6-dialkylated phenols are separated from the 2,4-dialkylated isomers by extraction with aqueous caustic. Whatever the process, however, the resultant reaction mixture comprises a basic solution, which may be aqueous or non-aqueous, containing the solid or dissolved phenolic product.

It has been repeatedly observed that under these conditions both the solution system and the solid or liquid phenolic product are or tend to become highly colored. The colors observed range from amber and orange to purple, red and burgundy. From such systems, the phenolic products are generally recovered and purified by distillation, recrystallization, washing or other treatments to yield a substantially white or colorless product suitable for use.

The nature of the coloring of these phenolic compounds is not completely understood. It is likely that the color results from the side reactions of the normally uncolored phenol in basic solution, resulting perhaps in the formation of highly colored quinone products. In any event, presence of these colored materials in the phenolic compounds renders the compounds unsuitable for use in light-colored substrates such as white sidewall tire stock and other light-colored rubber products, in light-colored lubricating oils and hydraulic fluids, in white or light-colored plastics such as polyethylene and polypropylene, and in foodstuffs generally.

By neutralizing the basic media containing the colored phenolic compounds, the color of the compounds may be reduced. However, in practice, when the basic media are neutralized with strongly acid reagents, the media are left in an acidic condition. The disadvantage of this excess acid is that it cannot be readily and effectively separated from the phenolic products, so that even thoroughly washed materials retain traces of the acid. Such traces of acid have a deleterious effect on the usefulness and stability of the phenolic material itself, leading to color formation or decomposition of the antioxidant under service conditions. In general, the phenolic compounds are decolorized by repeated washings with neutral aqueous or organic reagents which serve to remove the colored ingredients. While neutralization of the reaction medium is theoretically desirable, it has proved impractical to bring large batches to exact neutrality by addition of such acidic reagents, and in general the batch so treated is left in either acidic or basic condition.

It has now been found that certain phenolic compounds in basic media may be easily and quickly decolorized to white or colorless substances. It is therefore an object of the present invention to provide a method for decolorizing such phenolic compounds in basic media. Another object is the provision of a convenient and effective decolorizing method for phenolic antioxidant compounds in basic liquid media. The provision of a method for decolorizing certain dialkylphenols in basic media employing a gaseous reagent is still another object. The provision of a decolorizing process for alkylated phenolic antioxidants in basic liquid media that is operative over a wide range of temperatures, is another object of the invention. Other objects will be apparent from the following description of the invention.

These objects are accomplished in the following invention by the process for substantially decolorizing a normally uncolored cryptophenolic antioxidant in a liquid containing miscible base which comprises introducing into said liquid an amount of carbon dioxide sufficient to substantially decolorize the cryptophenolic antioxidant. More specifically, the invention is a process for substantially decolorizing a normally uncolored phenolic compound selected from the group consisting of 2,4,6-trialkylphenol, 2,6-dialkyl-4-hydroxymethylphenol, 2,6-dialkyl-4-alkoxyalkylphenol and bis(3,5-dialkyl-4-hydroxyphenyl)alkanes, said compound having at least one of the alkyl groups ortho to the phenolic hydroxyl group branched on the alpha carbon atom, in a liquid containing miscible base, which comprises introducing into said liquid an amount of carbon dioxide sufficient to substantially decolorize the phenolic compound. By "substantially decolorizing" is meant the removal of all or most of the color of the alkylated phenol, rendering the treated product almost entirely or entirely colorless if a liquid or white if a solid.

The process is best understood by considering the following detailed account thereof. The phenolic compounds which are decolorized in the process are those compounds which comprise a mononuclear benzene ring having a hydroxyl group attached directly to one of the ring carbons and an alkyl substituent attached to each of the ortho carbon atoms, at least one of said alkyl groups being branched on the alpha carbon atom. The other ring carbon atoms may be substituted with other radicals such as hydrogen, other hydrocarbyl groups such as alkyl, alkenyl, aryl, aralkyl and the like. The preferred class of compounds are those having three ring substituents in the ortho and para positions relative to the hydroxyl group. Exemplary compounds are 2,6-di-tert-butyl-4-methylphenol; 2,4-dimethyl-6-tert-butylphenol; 2-ethyl-4,6-di-tert-butylphenol; 2,4,6-tri-t-butylphenol; 2,6-diamyl-6-phenylphenol; 2,6-diisopropyl-6-benzylphenol; 2,6-dicyclohexyl-4-methylphenol; 2,4-dimethyl-6-tolyphenol; and the like. Particularly preferred of this class are those wherein each of the substitutents has up to 8 carbon atoms and both of the substituents ortho to the hydroxyl group are branched on the alpha carbon atom, since these compounds have the best antioxidant properties.

Other suitable substituents include alkoxyhydrocarbyl, e.g., alkoxyalkyl, alkoxyaryl, alkoxycyclohexyl, such as those having the general formula —R'—O—R where R' is alkylene, preferably having up to 8 carbon atoms, and most preferably methylene, and R is alkyl, cycloalkyl, aryl or aralkyl. Representative compounds are those having the general formula

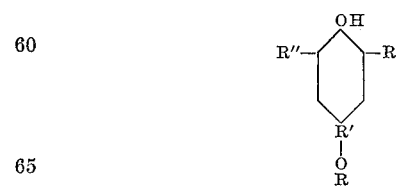

where R and R' have the significance noted above and each R" is an alkyl group branched on the alpha carbon atom. Representative compounds include 2,6-di-tert-butyl-4-methoxymethylphenol; 2,6-diisopropyl-4-methoxyphenylphenol; 2-isopropyl-6-tert-butyl-4-methoxycyclohexylphenol; 2,6-di-tert-amyl-4-butoxybutylphenol; and the like. Compounds of this type are described in the patent to Filbey, U.S. 2,571,838, issued June 10, 1958. Another class of phenolic compounds which are decolorized by the process of the invention are the dialkylmethylolphenols, particularly those having the formula

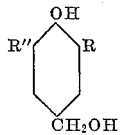

wherein R" has the above significance, e.g., 2,6-di-tert-butyl-4-methylolphenol; 2,6-diisopropyl-4-methylolphenol; 2-tert-butyl-6-isopropyl-4-methylolphenol and 2,6-dicyclohexyl-4-methylolphenol.

Other phenolic compounds decolorized by the process of the invention are such bisphenols as the bis(dialkylhydroxyphenyl)alkanes typified by the formula

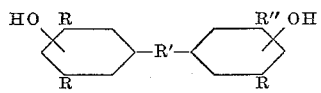

wherein R" is an alkyl group branched on the alpha carbon atom, R is selected from alkyl, cycloalkyl, aryl and aralkyl radicals as above, R' is alkylene, preferably having up to 8 carbon atoms and most preferably methylene, and each of the hydroxyl radicals is on a ring carbon atom either ortho or para to the alkylene radical. Typical bisphenols are bis(3,5-di-tert-butyl-4-hydroxyphenyl)methane; bis(3-isopropyl-5-tert-butyl-4-hydroxyphenyl)methane; bis(3-tert-butyl-5-methyl-2-hydroxyphenyl)methane; 1,2-bis(3,5-di-tert-butyl-4-hydroxyphenyl)ethane; 1,8-bis(3-isopropyl-5-ethyl-2-hydroxyphenyl)octane; 1,3-bis(3-cyclohexyl-5-methyl-4-hydroxyphenyl)propane, and the like.

An alternative class of bisphenolic cryptophenol antioxidants also susceptible to decolorization with carbon dioxide are the bis(3,5-dialkyl-hydroxybenzyl)benzenes having the formula

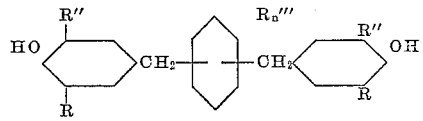

wherein R" and R have the above significance, R''' is selected from the group consisting of the hydrogen atom and alkyl radicals having up to 8 carbon atoms, and $n$ is an integer from 1 to 4. Typical of these cryptophenols are 1,4-bis(3,5-diisopropyl-2-hydroxybenzyl)benzene; 1,4-bis(3-tert-butyl-5-methyl-4-hydroxybenzyl)xylene; 1,4-bis-(3,5-di-tert-butyl-4-hydroxybenzyl)durene, and the like. Most preferred members of this class of antioxidants are those wherein both alkyl substituents on the phenolic nucleus are branched on the alpha carbon atom.

The most preferred class of reactants in the process and the best antioxidants are those 2,6-dialkylphenolic compounds wherein each of the alkyl groups ortho to the phenolic hydroxyl group is branched on the alpha carbon atom, i.e., is selected from secondary and tertiary alkyl groups and has the general structure

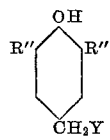

wherein Y is selected from the group of monovalent radicals consisting of hydrogen, alkyl having up to 8 carbon atoms, the hydroxyl radical —OH, the alkoxy radical —OR where R is alkyl having up to 8 carbon atoms, and the radical.

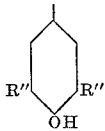

wherein each of the R" radicals is an alkyl radical branched on the alpha carbon atom and having up to 8 carbon atoms.

All of the phenolic compounds described above are those having a phenolic hydroxyl group hindered by at least one, and preferably two, secondary or tertiary alkyl radicals. Such phenolic compounds are known as cryptophenols because of the sterically hindered nature of the phenolic hydroxyl, and because of this hindrance, have been observed to have antioxidant properties which ordinary alkylated phenols lack. Furthermore, because of the steric obstruction to access to the hydroxyl group, the phenols react only with difficulty through this group. For example, in conventional basic liquid media these phenols do not react with the base to form phenolates nor, in the process of the invention, are they known to react in any way with the carbon dioxide. It is therefore an important advantage of the invention that in the decolorization of the phenolic compounds in the process described no chemical change in the phenolic products takes place.

Because the tertiary alkyl groups afford the most hindrance to the adjacent phenolic hydroxyl group, it is preferred that in the compounds described at least one, and preferably both, of the R" radicals be tertiary alkyl radicals.

These phenolic compounds, while differing somewhat in structure have the common characteristic that they are all antioxidants and that they are all colored in basic media. The latter characteristic is important because most of these classes of compounds are exposed at some stage of their manufacture to liquid media containing base. For example, the preferred method for separating 2,6-dialkylated phenols from 2,4-dialkylated phenols is by extraction of the latter from the former with aqueous alcoholic caustic. The other classes of compounds are, in general, produced by the base-catalyzed condensation of dialkylphenols with such aldehydes as formaldehyde, and with such other reagents as alcohols, see, for example, the patent to Filbey noted above, and the patent to Filbey and Coffield, U.S. 2,807,653, issued September 24, 1957. The bases involved include ammonium hydroxide, alkali metal hydroxides such as potassium and sodium hydroxide; alkaline earth hydroxides, such as barium or calcium hydroxide; carbonates, such as ammonium, sodium, potassium or calcium carbonate; oxides, such as calcium oxide; alcoholates including sodium methoxide, potassium t-butoxide and lithium ethoxide; alkali metal phenates such as sodium phenate and potassium cresylate; and such organic bases as the quaternary ammonium hydroxides, quaternary ammonium salts, and primary, secondary and tertiary amines. While the bases preferred are those miscible with the medium containing the phenolic compound, even the substantially immiscible bases are sufficiently soluble to produce color in the phenolic material.

The phenolic compounds develop color in the presence of base in either aqueous or non-aqueous liquids, since the colored oxidation products are produced with the phenolic materials in any liquid phase. For example, when 2,6-di-tert-butylphenol is condensed with methanol and formaldehyde in an aqueous solution of potassium hydroxide, the aqueous solution of the product is a purplish liquid, and the product 2,6-di-tert-butyl-4-methoxymethylphenol is purple. When this 2,6-di-tert-butyl-4-methoxymethylphenol is hydrogenolyzed in basic methanol over a hydrogenation catalyst such as Raney nickel to yield 2,6-di-tertbutyl-4-methylphenol, the hydrogenolysis solution and the product 2,4,6-trialkylphenol are reddish or amber.

Similarly, when 2,6-dialkylphenols, such as 2,6-diisopropylphenol, are condensed with formaldehyde in either aqueous or organic media containing base, the product bis(3,5-dialkyl-4-hydroxyphenyl) methane is reddish-blue in color. Typical organic media include such liquids as diethyl ether and other ethers, dioxane, such secondary and tertiary alcohols as isopropanol and t-butyl alcohol, glycols such as ethylene glycol, and the like. Preferred alkanols are those monohydric alcohols having up to eight carbon atoms. The principal requirement of the liquid is that it is substantially non-reactive with the phenolic compounds.

It has been found, unexpectedly, that carbon dioxide has the property of decolorizing the phenolic compounds and the basic liquid media in which they are produced so that substantially clean white or colorless products are obtained. The decolorization is achieved simply and effectively by introducing carbon dioxide into the basic liquid medium containing the phenolic compound in an amount sufficient to substantially decolorize the phenolic compound.

While the carbon dioxide may be introduced into the liquid medium in any state of matter, it is most conveniently employed in its gaseous form. Thus, decolorization is achieved merely by bubbling the gas through a basic liquid in which the phenolic compound is either dissolved or suspended. The amount of carbon dioxide employed will, of course, depend on the nature of the basic liquid system and on intensity of color in the system and in the phenolic compound. However, it has been observed that the minimal amount required is that which will produce the desired degree of decolorization, and the introduction of more carbon dioxide into the liquid serves no useful purpose. It should be emphasized, however, that addition of more carbon dioxide than required to decolorize the phenolic compounds, while uneconomical, produces no adverse effects on either the liquid system or the phenolic material. The preferred minimal amount of carbon dioxide is that molar amount equal to the molar amount of base in the liquid medium but, as noted, more carbon dioxide may be employed if desired.

The carbon dioxide may be introduced into the system at any convenient temperature, since it is effective at any temperature in which a liquid medium exists. At temperatures below about −15° C., however, the rate of decolorization is slow, and as a consequence −15° C. is the preferred minimum temperature. The carbon dioxide may also be introduced to any liquid temperature up to the boiling temperature of the liquid. In this regard, it is not material to the effectiveness of the decolorization method whether the liquid system containing the phenolic material is under subatmospheric, atmospheric or superatmospheric pressure. Furthermore, decolorization of the phenolic compounds by use of carbon dioxide, as described, is effective without the use of catalysts or buffers, although catalysts which have been employed for the preparation of the phenolic product being treated may be present in the liquid system without ill effect.

The decolorization process may conveniently be followed by observing the color of the cryptophenolic solution or precipitate being treated, and ceasing the addition of carbon dioxide when the desired degree of decolorization thereof has been achieved. Alternatively, the decolorization may be followed with automatic measurement equipment, since it has been observed that decolorization is complete when the liquid medium being treated has reached neutrality.

As has been pointed out above, the phenolic product being decolorized may be present in the basic liquid system during decolorization in either dissolved, liquid or solid form. Furthermore, it is frequently convenient to perform the decolorization of the phenolic material in combination with some other process step, such as crystallization, extraction, settling or the like. For example, the bis(hydroxyphenyl)alkanes described above are known to crystallize from basic aqueous or organic reaction media as such media are cooled, and it is frequently convenient to sparge gaseous carbon dioxide into the system during cooling. Under these conditions the gas serves both to decolorize the bisphenols and to agitate the system for more effective heat transfer.

No neutralization or further chemical treatment of the decolorized phenolic products to overcome the effects of the carbon dioxide is required. In general, the decolorized products are ready for removal from the liquid medium by such conventional methods as extraction, crystallization, distillation, centrifugation or the like, and for washing to remove solvents, salts, uncolored impurities, residual catalysts and other undesired impurities resulting from other process steps.

To illustrate the novel process of the reaction, the following specific examples are set forth. It should be understood, however, that these examples are merely illustrative and are not to be regarded as limitations to the appended claims since the basic teachings thereof may be varied at will as will be understood by one skilled in the art. In the examples, the proportions are expressed in parts by weight unless otherwise noted.

*Example I*

The compound 2,6-di-tert-butyl-4-hydroxymethylphenol was prepared by reacting together 50 parts of 2,6-di-tert-butylphenol and 3 parts of formaldehyde in 50 parts of anhydrous tert-butyl alcohol containing ¼ part of potassium hydroxide at 25° C. The resulting reaction mixture was light red in color.

Gaseous carbon dioxide was slowly bubbled through the liquid reaction mixture by means of a glass sparger. It was observed that as the carbon dioxide bubbled through the liquid the red color of the solution disappeared. Upon recovery of the dissolved 2,6-di-tert-butyl-4-hydroxymethylphenol by extraction with cyclohexane and crystallization therefrom, a clean white crystalline product was obained which required no further finishing.

Recovery of a similarly prepared sample of 2,6-di-tert-butyl-4-hydroxymethylphenol sample which had not been treated with carbon dioxide afforded a pinkish crystalline product which required several washes with cyclohexane and a recrystallization therefrom before a white product of comparable color was obtained.

*Example II*

The bisphenol bis(3,5-di-tert-butyl-4-hydroxyphenyl)-methane was prepared by the condensation of 2,6-di-tert-butylphenol with 2,6-di-tert-butyl-4-hydroxymethylphenol in anhydrous t-butyl alcohol containing 0.2% of potassium hydroxide at 80° C. The resulting solution was purplish in color.

Gaseous carbon dioxide was slowly bubbled through the reaction mixture by means of a glass sparger as the liquid cooled. It was observed that as the carbon dioxide was added the purple color of the mixture disappeared. At about 40° C., clean white crystalline bis(3,5-di-tert-butyl-4-hydroxyphenyl)methane began to precipitate from the reaction mixture. The white sparkling solid bisphenol was recovered by filtration at 25° C.

A sample of the same bisphenol similarly prepared but not treated with carbon dioxide was a crystalline product having a definite purple color which was removed only by recrystallizing the product from cyclohexane.

Comparable decolorization is obtained by treating an aqueous methanolic solution of bis(3,5-di-tert-butyl-4-hydroxyphenyl)methane, prepared by condensing 2,6-di-tert-butylphenol with formaldehyde in aqueous methanolic potassium hydroxide.

*Example III*

The compound 2,6-di-tert-butyl-4-methoxymethyl-phenol was prepared by reacting together 103 parts of 2,6-ditert-butylphenol, 78.5 parts of paraformaldehyde in 400 parts of methanol and 120 parts of water containing 2 parts of sodium hydroxide at 70° C. The resulting reaction mixture had a yellowish color.

The addition of gaseous carbon dioxide to the reaction mixture, as in the previous examples, effectively decolorizes the solution so that, when crushed ice is added thereto, a white crystalline product was obtained. A sample obtained in a similar manner but without carbon dioxide treatment had a slightly amber color which could not be removed by washing with water.

*Example IV*

The compound 2,6-di-tert-butyl-4-methylphenol was prepared by dissolving 50 parts of 2,6-di-tert-butyl-4-methoxymethylphenol in 150 parts of methanol containing one part of basic copper chromite catalyst, and hydrogenolyzing the ether at 103–105° C. and 250–500° p.s.i.g. of hydrogen. Under these conditions hydrogenolysis of the 2,6-di-tert-butyl-4-methoxymethylphenol to the 2,6-di-tert-butyl-4-methylphenol was virtually quantitative. The basic reaction mixture containing the starting 2,6-di-tert-butyl-4-methoxymethylphenol and the basic treated solution containing the product were both characterized by a straw color.

When the catalyst has been filtered out and the carbon dioxide gas is bubbled through the basic methanol filtrate containing the 2,6-di-tert-butyl-4-methylphenol, as in the previous examples, the straw color rapidly fades and the solution becomes water-white and clear. From the resulting solution a clean brilliant white crystalline product of 2,6-di-tert-butyl-4-methylphenol is readily obtained by evaporating off the alcohol.

The crystalline phenolic product obtained when the filtrate has not been treated with carbon dioxide is tinged with yellow or buff and must be thoroughly washed or recrystallized to yield a white product of comparable color.

I claim as my invention:

1. A process for substantially decolorizing a normally-uncolored cryptophenol in a liquid containing miscible base, which comprises introducing into said liquid an amount of carbon dioxide sufficient to substantially decolorize the cryptophenol, said cryptophenol having been discolored prior to treatment with carbon dioxide.

2. A process for substantially decolorizing a normally uncolored phenolic compound selected from the group consisting of 2,4,6-trialkylphenol, 2,6-dialkyl-4-hydroxymethylphenol, 2,6-dialkyl-4-alkoxyalkylphenol, and bis-(3,5-dialkyl-4-hydroxyphenyl)alkane, said compound having at least one of the alkyl groups ortho to the phenolic hydroxyl group branched on the alpha carbon atom, in a liquid containing miscible base, which comprises introducing into said liquid an amount of carbon dioxide sufficient to substantially decolorize the phenolic compound, said compound having been discolored prior to treatment with the carbon dioxide.

3. The process of claim 2 wherein the phenolic compound is a 2,6-dialkyl-4-hydroxymethylphenol wherein at least one of the alkyl groups ortho to the phenolic hydroxyl group is branched on the alpha carbon atom.

4. The process of claim 2 wherein the phenolic compound is a bis(3,5-dialkyl-4-hydroxyphenyl)alkane wherein at least one of the alkyl groups ortho to each phenolic hydroxyl group is branched on the alpha carbon atom.

5. The process of claim 2 wherein the liquid is a nonaqueous liquid selected from the group consisting of alcohols and ethers.

6. A process for substantially decolorizing a normally uncolored phenolic compound selected from the group consisting of 2,4,6-trialkylphenols, 2,6-dialkyl-4-hydroxymethylphenols, 2,6-dialkyl-4-alkoxyalkylphenols and bis-(3,5-dialkyl-4-hydroxyphenyl)alkanes, said compound having both of the alkyl groups ortho to the phenolic hydroxyl branched on the alpha carbon atom, in a liquid containing miscible base, which comprises introducing into said liquid an amount of gaseous carbon dioxide sufficient to substantially decolorize the phenolic compound, said compound having been discolored prior to treatment with the carbon dioxide.

7. The process of claim 6 wherein the phenolic compound is 2,6-di-t-butyl-4-hydroxymethylphenol.

8. The process of claim 6 wherein the phenolic compound is bis(3,5-di-t-butyl-4-hydroxyphenyl)methane.

9. The process of claim 6 wherein the liquid is a monohydric alkanol having up to 8 carbon atoms.

10. The process of claim 6, wherein the phenol is 2,6-di-tert-butyl-4-methyl phenol.

11. A process for substantially decolorizing normally uncolored 2,6-dialkyl-4-hydroxymethylphenol, each of said alkyl groups being branched on the alpha carbon atom and having up to 8 carbon atoms, in a monohydric alkanol having up to 8 carbon atoms and containing miscible base, which comprises introducing into the alkanol an amount of carbon dioxide sufficient to substantially decolorize the 2,6-dialkyl-4-hydroxymethylphenol, said compound having been discolored prior to treatment with carbon dioxide.

12. A process for substantially decolorizing normally uncolored bis(3,5-dialkyl-4-hydroxyphenyl)methane, each of said alkyl groups being branched on the alpha carbon atom and having up to 8 carbon atoms, in a monohydric alkanol containing up to 8 carbon atoms and containing miscible base, which comprises introducing into the alkanol an amount of carbon dioxide sufficient to substantially decolorize the bis(3,5-dialkyl-4-hydroxyphenyl)methane, said compound having been discolored prior to treatment with carbon dioxide.

13. The process for substantially decolorizing normally-uncolored bis(3,5-dialkylhydroxybenzyl)benzene, each of said alkyl groups having up to 8 carbon atoms and at least one of said alkyl groups on each benzyl nucleus being branched on the alpha carbon atoms, in a liquid containing miscible base, which comprises introducing into said liquid an amount of carbon dioxide equal to the amount of base dissolved in the liquid, said bis(3,5-dialkylhydroxybenzyl)benzene having been discolored prior to treatment with carbon dioxide.

References Cited in the file of this patent

Stillson et al.: Jour. Amer. Chem. Soc., vol. 67 (1945), 303–307 (5 pages; page 305 only relied on).

Coffield et al.: Jour. Amer. Chem. Soc., vol. 79 (1957), 5019–23 (5 pages; page 5022 only relied on).

(Copies of above in Pat. Off. Sci. Library.)